(12) United States Patent
Horisawa

(10) Patent No.: US 7,912,017 B2
(45) Date of Patent: Mar. 22, 2011

(54) WIRELESS CONNECTION SYSTEM AND WIRELESS CONNECTION METHOD

(75) Inventor: Shozo Horisawa, Chiba (JP)

(73) Assignee: Sony Corporation, Tokyo (JP)

( * ) Notice: Subject to any disclaimer, the term of this patent is extended or adjusted under 35 U.S.C. 154(b) by 693 days.

(21) Appl. No.: 11/476,357

(22) Filed: Jun. 27, 2006

(65) Prior Publication Data

US 2007/0002817 A1    Jan. 4, 2007

(30) Foreign Application Priority Data

Jun. 29, 2005   (JP) ................ P2005-190338

(51) Int. Cl.
*H04W 4/00*   (2009.01)
(52) U.S. Cl. ................................. 370/338
(58) Field of Classification Search ............ 370/338; 713/156; 709/230, 25; 726/5, 3; 455/435.2
See application file for complete search history.

(56) References Cited

U.S. PATENT DOCUMENTS

| | | | |
|---|---|---|---|
| 5,175,418 A | 12/1992 | Tanaka | |
| 5,580,444 A | 12/1996 | Burrows | |
| 6,068,193 A | 5/2000 | Kreft | |
| 7,042,852 B2 | 5/2006 | Hrastar | |
| 7,127,210 B2 | 10/2006 | Aoyagi | |
| 7,155,162 B2 | 12/2006 | Doi et al. | |
| 7,325,246 B1 * | 1/2008 | Halasz et al. | 726/2 |
| 7,359,674 B2 * | 4/2008 | Markki et al. | 455/41.2 |
| 7,474,425 B2 * | 1/2009 | Sasama | 358/1.15 |
| 2001/0023446 A1 | 9/2001 | Balogh | |
| 2001/0025878 A1 | 10/2001 | Hendrick | |
| 2003/0018889 A1 | 1/2003 | Burnett et al. | |
| 2003/0054846 A1 | 3/2003 | Parry | |
| 2003/0087629 A1 | 5/2003 | Juitt et al. | |
| 2003/0092395 A1 | 5/2003 | Gassho et al. | |
| 2003/0217289 A1 | 11/2003 | Ammon et al. | |
| 2003/0224797 A1 | 12/2003 | Kuan et al. | |
| 2003/0233567 A1 | 12/2003 | Lynn et al. | |
| 2004/0008652 A1 | 1/2004 | Tanzella et al. | |
| 2004/0031856 A1 | 2/2004 | Atsmon et al. | |

(Continued)

FOREIGN PATENT DOCUMENTS

EP    0957651    11/1999

(Continued)

OTHER PUBLICATIONS

Part 11: Wireless LAN Medium Access Control(MAC) and Physical Layer(PHY) Specifications; ; IEEE Std 802.11; 1-512pp; Institute of Electrical and Electronics Engineers, Inc.; 1999.

(Continued)

*Primary Examiner* — Ricky Ngo
*Assistant Examiner* — Chandrahas Patel
(74) *Attorney, Agent, or Firm* — Robert J. Depke; Rockey, Depke & Lyons, LLC

(57) ABSTRACT

A wireless connection system having at least one host apparatus and at least one client apparatus, wherein: proximity wireless communication is executed when a host apparatus and a client apparatus execute wireless communication with each other on the basis of a predetermined wireless communication standard in which the client apparatus is brought close to the host apparatus; authentication processing is executed for authenticating connection setting information by use of the proximity wireless communication; and if authentication is successful in the authentication processing, execution of the wireless communication is enabled and, if authentication is unsuccessful, execution of the wireless communication is disabled.

5 Claims, 5 Drawing Sheets

U.S. PATENT DOCUMENTS

| | | |
|---|---|---|
| 2004/0083362 A1 | 4/2004 | Park et al. |
| 2004/0111494 A1 | 6/2004 | Kostic et al. |
| 2004/0236860 A1 | 11/2004 | Logston et al. |
| 2004/0252837 A1 | 12/2004 | Harvey et al. |
| 2004/0253944 A1 | 12/2004 | Kelley |
| 2005/0071711 A1 | 3/2005 | Shaw |
| 2005/0097595 A1 | 5/2005 | Lipsanen et al. |
| 2005/0160138 A1 | 7/2005 | Ishidoshiro |
| 2005/0243129 A1 | 11/2005 | Kim |
| 2005/0286478 A1 | 12/2005 | Mela et al. |

FOREIGN PATENT DOCUMENTS

| | | |
|---|---|---|
| JP | 02-280292 | 11/1990 |
| JP | 10-93508 | 4/1998 |
| JP | 2001-111543 | 4/2001 |
| JP | 2001-156704 | 6/2001 |
| JP | 2001-189722 | 7/2001 |
| JP | 2002-124960 | 4/2002 |
| JP | 2002-204239 | 7/2002 |
| JP | 2002-351766 | 12/2002 |
| JP | 2002-359623 | 12/2002 |
| JP | 2003-152735 | 5/2003 |
| JP | 2003-229872 | 8/2003 |
| JP | 2004-032462 | 1/2004 |
| JP | 2004-364199 | 12/2004 |
| JP | 2005-167946 | 6/2005 |

OTHER PUBLICATIONS

Part 11: Wireless LAN Medium Access Control (MAC) and Physical Layer (PHY) specifications High-speed Physical Layer in the 5 GHz Band; IEEE Std 802.11a; 1-83pp; Institute of Electrical and Electronics Engineers, Inc.; 1999.

Part 11: Wireless LAN Medium Access Control (MAC) and Physical Layer (PHY) specifications: Higher-Speed Physical Layer Extension in the 2.4 GHz Band; IEEE Std 802.1 lb; 1-89pp; Institute of Electrical and Electronics Engineers, Inc.; 2000.

Part 11: Wireless LAN Medium Access Control (MAC) and Physical Layer (PHY) specifications Amendment 4: Further Higher Data Rate Extension in the 2.4 GHz Band; IEEE Std 802.11g; 1-67pp; Institute of Electrical and Electronics Engineers, Inc.; 2003.

* cited by examiner

WIRELESS CONNECTION SYSTEM AND WIRELESS CONNECTION METHOD

CROSS REFERENCES TO RELATED APPLICATIONS

The present invention contains subject matter related to Japanese Patent Application JP 2005-190338 filed in the Japanese Patent Office on Jun. 29, 2005, the entire contents of which being incorporated herein by reference.

BACKGROUND OF THE INVENTION

1. Field of the Invention

The present invention relates to a wireless connection system and a wireless connection method.

2. Description of the Related Art

IEEE (Institute of Electrical and Electronics Engineers) 802.11 and Bluetooth (trademark) are known as methods of providing wireless connection between a plurality of devices by use of radio waves. IEEE 802.11 is divided into IEEE 802.11a, IEEE 802.11b, and IEEE 802.11g by the difference in transmission scheme and frequency band used. For example, IEEE 802.11b is used for wirelessly interconnecting a plurality of personal computers and an access point to build a so-called wireless LAN (Local Area Network).

The communication ranges of the above-mentioned IEEE 802.11b and Bluetooth are approximately several tens of meters. For a method of shorter wireless communication, a RFID (Radio Frequency Identification) tag is known. The RFID tag, also referred to as a wireless tag or a wireless IC tag, provides wireless communication by reading data from a RFID tag installed in another electronic device for example on demand from a reader/writer. This wireless communication uses frequencies 125 KHz, 13.56 MHz, 433 MHz, UHF band (800/900 MHz), 2.45 GHz, and 5.8 GHz, for example.

However, the wireless LAN's gaining the popularity involves the problems of having to ensure the security in the communication executed on the basis of the wireless LAN against illegal data interception, unintended data leakage, and so on. In order to ensure the security, access restriction is practiced by setting SSID (Service Set Identifier), WEP (Wired Equivalent Privacy) key, and MAC (Media Access Control) key, thereby rejecting the access from terminals having different WEP keys, for example.

Japanese Patent Laid-Open No. 2003-229872 discloses an invention for automatically setting wireless connection by bringing an IC card to proximity to set a SSID and a WEP key, thereby starting wireless communication.

SUMMARY OF THE INVENTION

With the above-mentioned related-art technology, if a SSID and a WEP key are stolen by illegal means for example to be set to a wireless communication device and these SSID and WEP key are correct on that wireless communication device, then the wireless communication of that wireless communication device is permitted. Even if not stolen by illegal means, these SSID and WEP key may be used by persons who retired from companies for example to break into LAN systems thereof, thereby presenting security problems.

A password may be used to prevent the unauthorized entry into LAN systems; still, it is possible to encounter similar problems to those mentioned above if the password itself is stolen. Thus, methods of using SSID, WEP key, and password for authentication processing require the careful management of SSID, WEP key, and password and, if the leakage of thereof occurs, cannot prevent unauthorized attempts of breaking in LAN systems.

Recently, home LANs for building LANs in homes have been gaining popularity. While meticulous care is practiced with corporate wireless LANs so as to prevent data theft and leakage, home LANs is far less guarded due to the convenience itself brought about by the wireless LAN technology. In addition, it is said that many home LAN users are not versed in the wireless LAN technology, thereby unwilling to positively execute necessary security settings. Consequently, it is desired to prevent attempts of breaking into home LAN systems by use of a simple security protection method.

Therefore, the present invention addresses the above-identified and other problems associated with related-art methods and apparatuses and solves the addressed problems by providing a wireless connection system and a wireless connection method that can enhance network security by always executing authentication processing at starting every wireless communication session, thereby minimizing hazards of unauthorized intrusion into LAN systems, theft and leakage of data therefrom, and use of illegally obtained data.

In carrying out the invention and according to one embodiment thereof, there is provided a wireless connection system having at least one host apparatus and at least one client apparatus. In this system, proximity wireless communication is executed when a host apparatus and a client apparatus execute wireless communication with each other on the basis of a predetermined wireless communication standard in which the client apparatus is brought close to the host apparatus; authentication processing is executed for authenticating connection setting information by use of the proximity wireless communication; and if authentication is successful in the authentication processing, execution of the wireless communication is enabled and, if authentication is unsuccessful, execution of the wireless communication is disabled.

In carrying out the invention and according to another embodiment thereof, there is provided a wireless communication method for wireless communication between at least one host apparatus and at least one client apparatus. This method is composed of processing steps of executing proximity wireless communication when a host apparatus and a client apparatus execute wireless communication with each other on the basis of a predetermined wireless communication standard in which the client apparatus is brought close to the host apparatus; executing authentication processing for authenticating connection setting information by use of the proximity wireless communication; and if authentication is successful in the authentication processing, enabling execution of the wireless communication and, if authentication is unsuccessful, disabling the wireless communication.

According to embodiments of the invention, the security of authentication processing is significantly enhanced, thereby preventing any unauthorized attempts for entering a network based on wireless LAN for example. In addition, according to embodiments of the invention, the security of wireless LAN communication is significantly enhanced by a simple method without using complicated encryption technologies.

DETAILED DESCRIPTION OF THE PREFERRED EMBODIMENTS

This invention will be described in further detail by way of embodiments thereof with reference to the accompanying drawings. Now, referring to FIG. 1, there is conceptually shown a wireless connection system in a home LAN practiced as one embodiment of the invention. In this wireless LAN system, a home server 1 that is one example of a host apparatus is wirelessly connected with a client apparatus 2 made up of one of a variety of electronic devices, for communication. The client apparatus 2 is any one of a PDA (Personal Digital Assistant), a digital still camera, a camcorder (camera and recorder), a portable audio device, a laptop personal computer, a PC (Personal Computer) card, a USB (Universal Serial Bus) stick, a USB dongle, and other multimedia devices.

The home server 1 stores not only document files, but also video content, such as video and recorded TV programs for example and audio content, such as music for example. It is also practicable for the home server 1 to have tuner capabilities for receiving television and radio broadcasts and cache capabilities for the WWW (World Wide Web). By wirelessly communicating with the home server 1, the client apparatus 2 can use various pieces of content stored in the home server 1.

Figure 1:
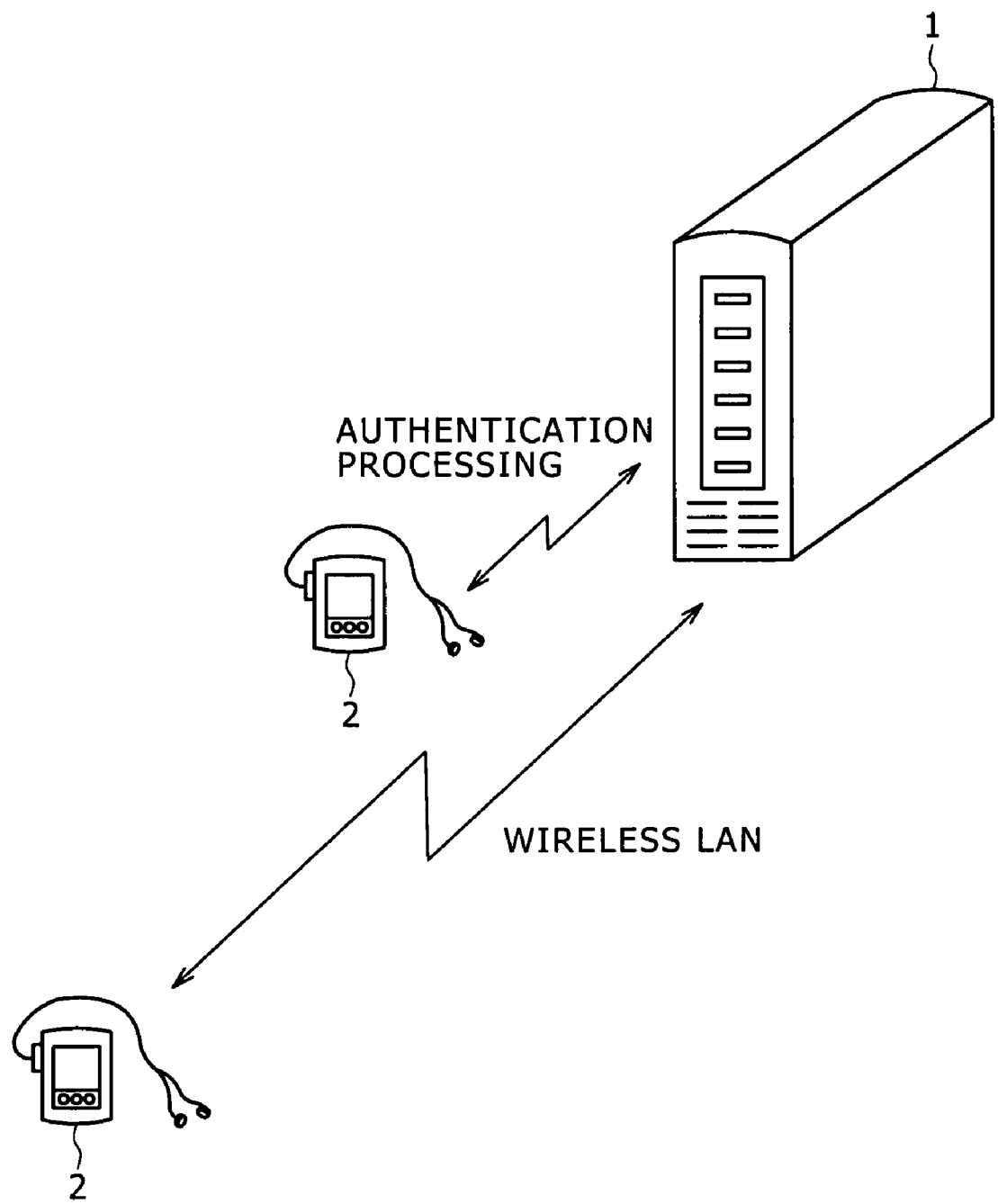
FIG. 1 is a schematic diagram illustrating an overview of a wireless communication system practiced as one embodiment of the invention.

For example, if the client apparatus 2 is a portable audio device, the client apparatus 2 is able to wirelessly communicate with the home server 1 and download audio content therefrom, thereby allowing every family member to listen to the downloaded music content anywhere in the home. If the client apparatus 2 is a PDA, every family member is able to view video content and received television broadcast stored in the home server 1 anywhere in the home. If the client apparatus 2 is a digital still camera, the user thereof is able to record taken images to the home server 1 to allow every family member to view the images anywhere in the home. It should be noted that, although only one home server 1 is shown in FIG. 1, two or more home servers 1 may be installed in this wireless communication system.

In addition, the home server 1 and the client apparatus 2 can execute proximity wireless communication with each other. Proximity wireless communication denotes a type of communication which is achieved by bringing the client apparatus 2 close to the home server 1. The communicable range of proximity wireless communication is equal to or less than one meter in general. Because a one-meter range around the home server 1 is generally inside a house, it may be impossible for proximity wireless commutation to be practiced with the home server 1 from outside a house.

This proximity wireless communication is executed by use of an RFID tag for example. The home server 1, functioning as a reader/writer, executes communication with the client apparatus 2 installed with an RFID tag through radio wave.

Figure 2:
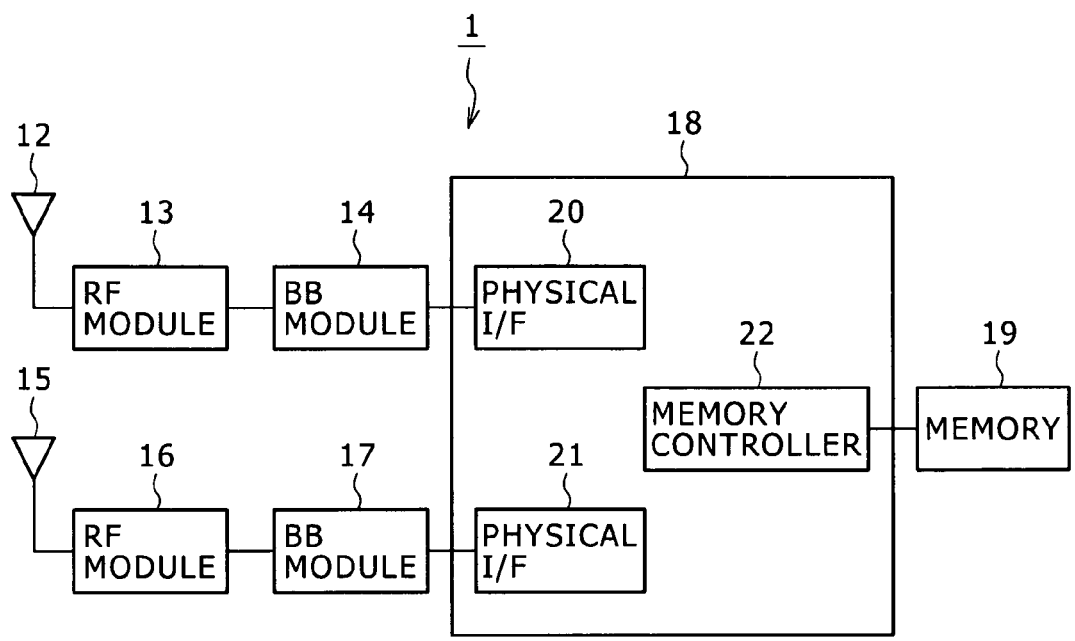
FIG. 2 is a block diagram illustrating an exemplary configuration of a communication system in a home server practiced as another embodiment of the invention.

Referring to FIG. 2, there is shown an exemplary configuration of the communication system of the home server 1. This communication system includes an antenna 12 for transmitting and receiving data with the client apparatus 2 through wireless connection, an RF (Radio Frequency) module 13, a BB (Base Band) module 14, an antenna 15 for executing proximity wireless communication with the client apparatus 2, an RF module 16, and a BB module 17. The home server 1 includes a MAC module 18 and a memory 19. The MAC module 18 includes a physical interface (I/F) 20, a physical I/F 21, and a memory controller 22. The home server 1 has storage means such as a hard disc drive in addition to the above-mentioned communication-associated components; however, the description of such storage means will be skipped because of no direct association with any embodiments of the invention.

Figure 3:
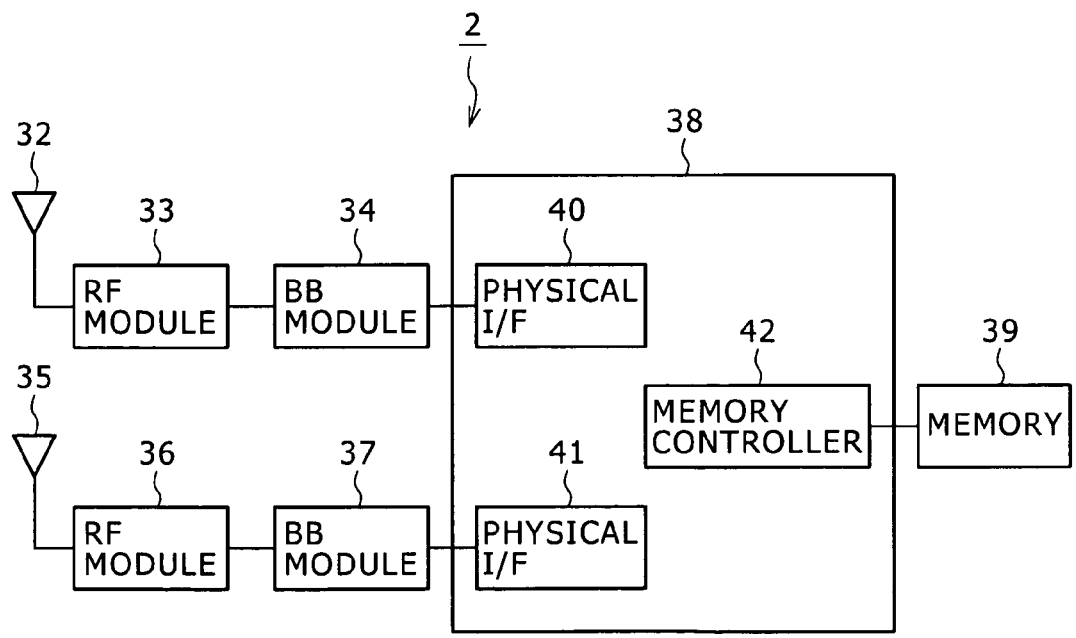
FIG. 3 is a block diagram illustrating a exemplary configuration of a communication system of a client apparatus practiced as still another embodiment of the invention.

Referring to FIG. 3, there is shown an exemplary configuration of the communication system of the client apparatus 2. The configuration of the communication system of the client apparatus 2 is substantially the same as that of the home server 1. The configuration of the communication system of the client apparatus 2 includes an antenna 32 for transmitting and receiving data with the home server 1 through wireless connection, an RF module 33, a BB module 34, an antenna 35 for executing proximity wireless communication with the home server 1, an RF module 36, and a BB module 37. The client apparatus 2 includes a MAC module 38 and a memory 39. The MAC module 38 includes a physical interface (I/F) 40, a physical I/F 41, and a memory controller 42. Other parts of the configuration are defined by the type of the client apparatus 2.

Figure 4:
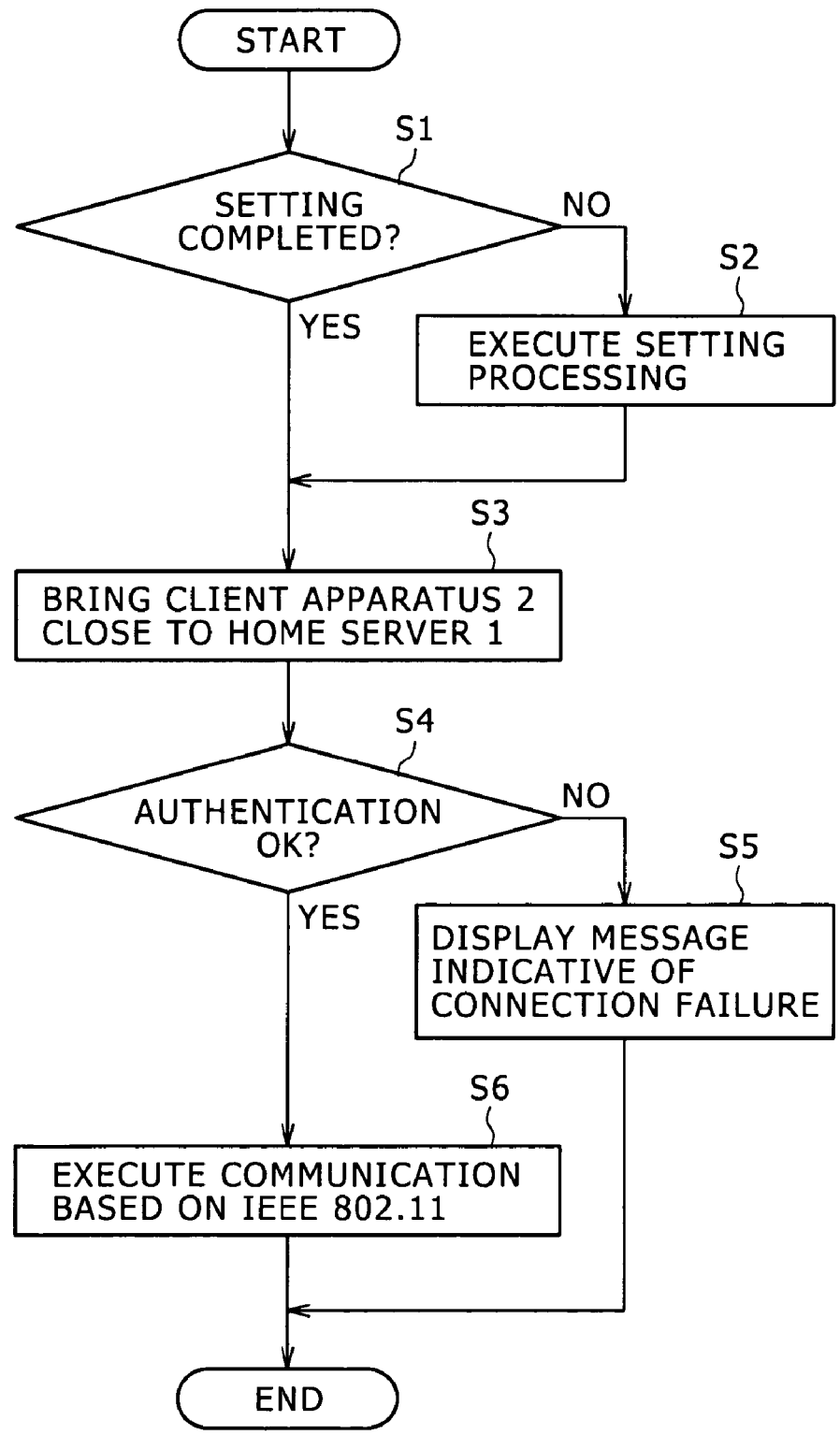
FIG. 4 is a flowchart indicative of a wireless connection procedure practiced as yet another embodiment of the invention.

Referring to FIG. 4, there is shown a flowchart indicative of a communication processing procedure practiced as one embodiment of the invention. In step S1, it is determined whether an SSID and a WEP key have already been set. If none of these items of connection setting information is found set, then the procedure goes to step S2.

In step S2, setting processing is executed. This setting processing is executed through the proximity wireless communication based on an RFID tag for example. The memory 19 of the home server 1 stores connection setting information such as SSID and WEP key in advance. At the time of setting, the connection setting information is read from the memory 19 of the home server 1 to be supplied to the BB module 17 via the physical I/F 21. The BB module modulates the data including the connection setting information to be transmitted from the antenna 15 through the RF module 16. The modulation method used is ASK (Amplitude Shift Keying), FSK (Frequency Shift Keying), or PSK (Phase Shift Keying) for example.

At the time of setting, the client apparatus 2 is brought close to the home server 1. Bringing the client apparatus 2 close to the home server 1 allows the reception of radio wave transmitted from the home server 1. The radio wave transmitted from the antenna 15 of the home server 1 is received by the antenna 35 of the client apparatus 2. The received radio wave is demodulated by the RF module 36 to be supplied to the MAC module 38 via the BB module 37. The connection setting information is converted by the memory controller 42 of the MAC module 38 into a predetermined format to be recorded to the memory 39, upon which the setting is completed.

It is also practicable to form a family between the home server 1 and the client apparatus 2 to record connection setting information to the memory 39 of the client apparatus 2 in advance. If connection setting information is recorded in advance, the processes of steps S1 and S2 can be skipped.

Conventionally, if connection setting information is set as described above, authentication processing to check if the connection setting information is proper or not is automatically executed at the time of a next connection. Therefore, connection setting information is obtained by a third party not permitted for connection, there is a possibility of allowing unauthorized connection that uses the connection setting information obtained by the third party.

In order to overcome the above-mentioned problem, a novel configuration is provided by the invention in which authentication processing is executed every time a client apparatus on which the setting processing has been executed is connected to a host apparatus such as a home server and, only when the authentication is successful, the communication by wireless connection is allowed between the client and host apparatuses. Further, because a LAN system built by wireless LAN is a physically limited space in general, authentication processing may be executed by proximity wireless communication such that only a person in that space can execute the authentication processing.

Referring to the flowchart shown in FIG. 4 again, the client apparatus 2 to which connection setting information has already been set is brought close to the home server 1 in step S3. Then, authentication processing is executed.

This authentication processing is executed by proximity wireless communication based on an RFID tag. When the client apparatus 2 is brought close to the home server 1, the antenna 35 of the client apparatus 2 can receive a weak radio wave transmitted from the antenna 15 of the home server 1.

The radio wave received by the antenna 35 of the client apparatus 2 causes an electromotive force on the RFID tag. Then, the received radio wave is demodulated by the RF module 36 of the client apparatus 2 and the demodulated signal is subjected to baseband signal processing in the BB band module 37 to be supplied to the MAC module 38. Then, the connection setting module is read from the memory 39 to be supplied to the BB module 37 through the physical I/F 41. Baseband signal processing is executed by the BB module 37 and the resultant signal is modulated by the RF module 36 to be transmitted from the antenna 35 as a radio wave.

The radio wave transmitted from the antenna 35 is received by the antenna 15 of the home server 1. The received radio wave is demodulated by the RF module 16. The demodulated signal is then subjected to baseband signal processed by the BB module 17 to be supplied to the MAC module 18. The home server 1 compares the connection setting information extracted from the radio wave transmitted from the client apparatus 2 with the connection setting information recorded to the memory 19. If a match is found, it indicates successful authentication; if a mismatch is found, it indicates unsuccessful authentication.

If the authentication of step S4 is unsuccessful, the procedure goes to step S5. In step S5, a message indicative that connection cannot be made is displayed on a display monitor for example of the home server 1 and the client apparatus 2 each. Alternatively, this message may be made in the form of an alert sound, for example.

If the authentication is successful, then the procedure goes to step S6. In step S6, wireless connection is established between the home server 1 and the client apparatus 2 and the communication based on IEEE 802.11 for example is executed. In the communication at this moment, the antenna 12, the RF module 13, and the BB module 14 are used at the home server 1 and the antenna 32, the RF module 33, and the BB module 34 are used at the client apparatus 2.

For example, when the use of the client apparatus 2 has ended and the power thereto is turned off, the communication between the client apparatus 2 and the home server 1 comes to an end and the wireless connection is turned off. To start the communication again, the processing of steps S3 and on described above is repeated.

Figure 5:
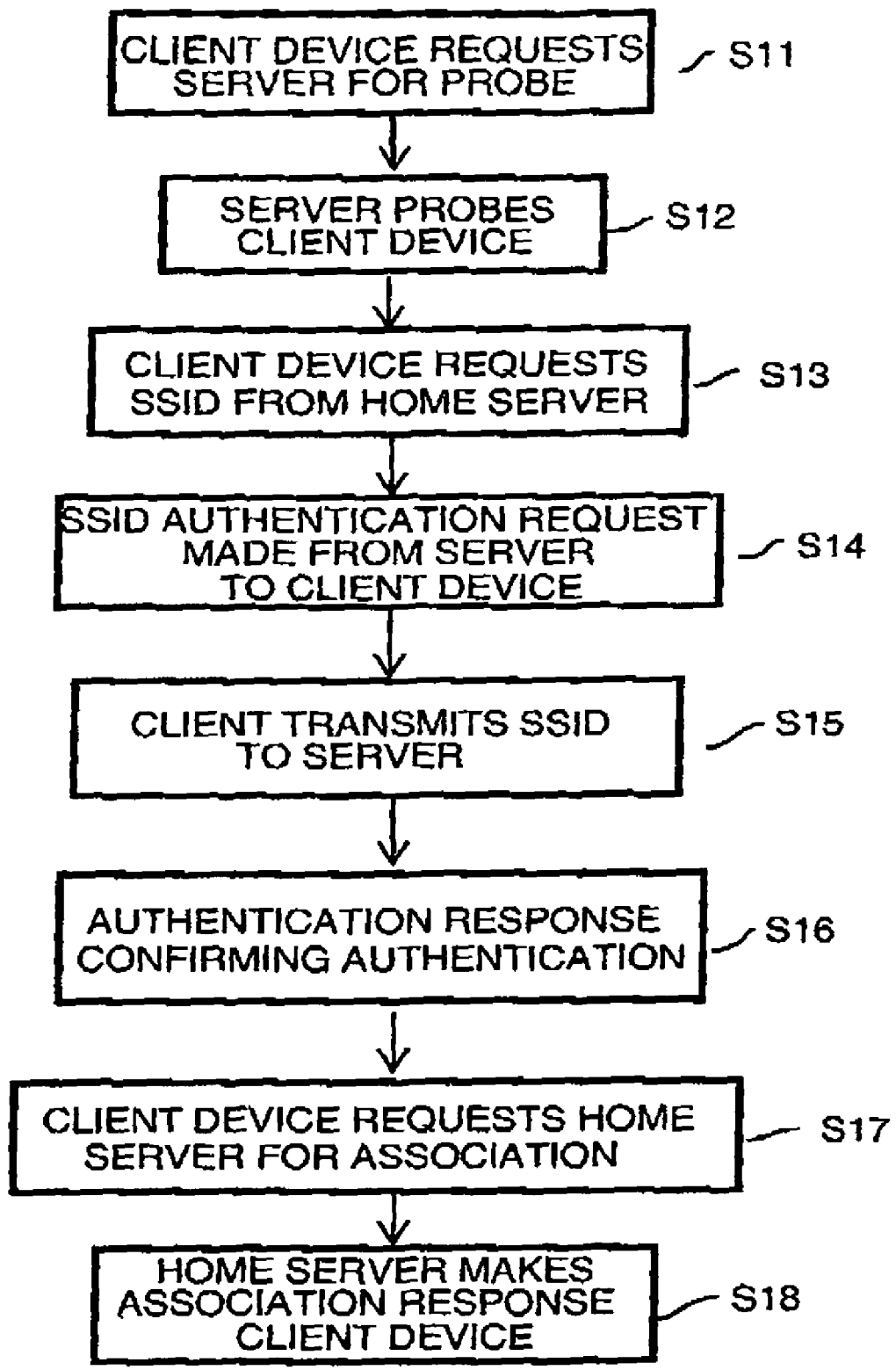
FIG. 5 is a flowchart indicative of an authentication processing procedure practiced as a different embodiment of the invention.

Referring to FIG. 5, there is shown an exemplary authentication processing procedure to be executed between the home server 1 and the client apparatus 2. In step S11, the client apparatus 2 requests the home server 1 for a probe. In step S12, a probe response to made to the client apparatus 2.

In step S13, the client apparatus 2 requests the home server 1 for SSID authentication. In step S14, in response to this SSID authentication request, an SSID authentication request is made from the home server 1 to the client apparatus 2.

In step S15, in response to the SSID authentication request from the home server 1, an SSID is transmitted from the client apparatus 2 to the home server 1 to make an authentication response. If the authentication is successful, then an authentication response indicative of the successful authentication is made in step S16.

The successful authentication leads to the establishment of wireless connection between the home server 1 and the client apparatus 2, thereby starting communication. Namely, in step S17, the client apparatus 2 requests the home server 1 for association. In step S18, in response to the association request, the home server 1 makes an association response to the client apparatus 2.

Figure 6:
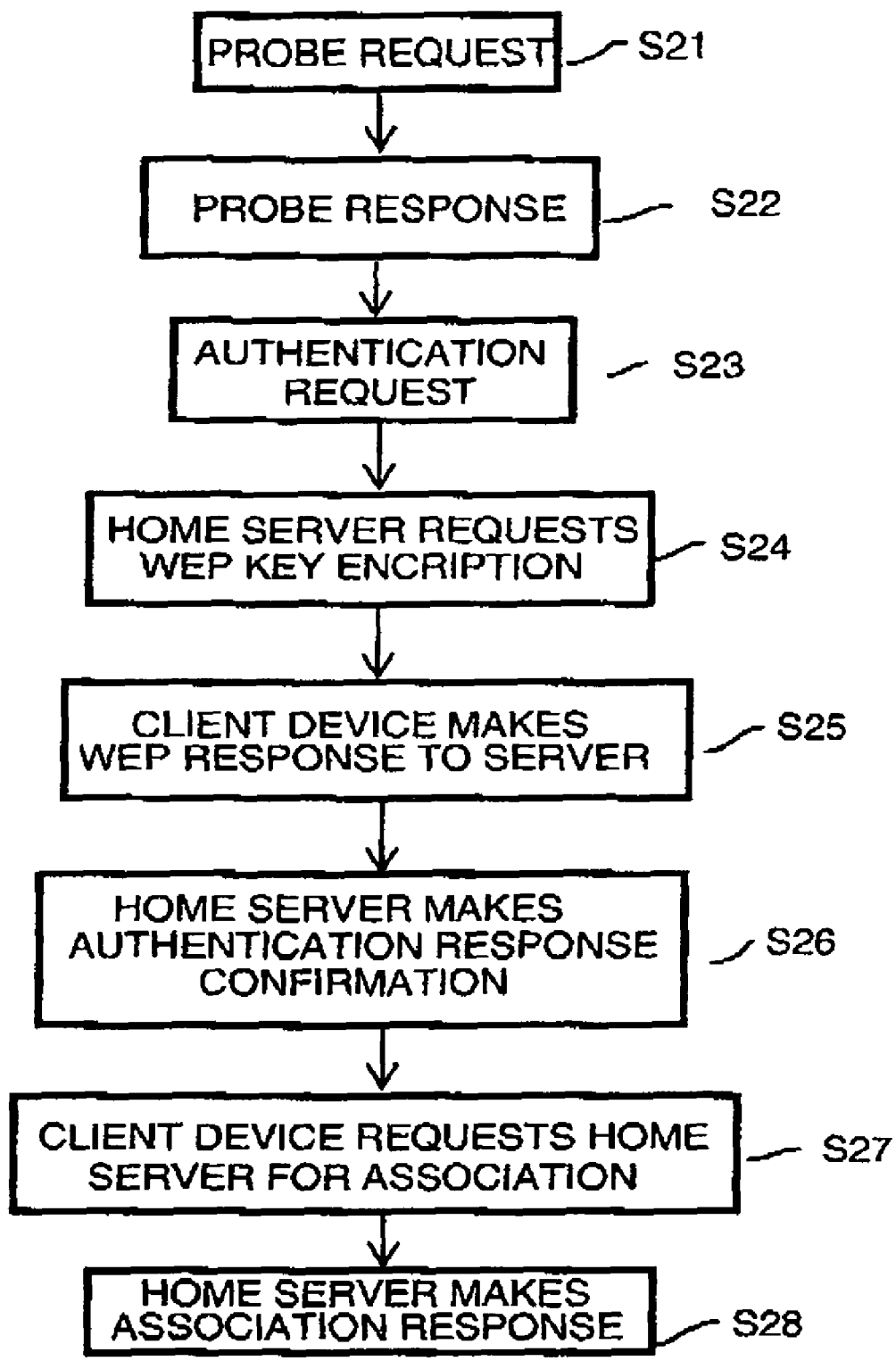
FIG. 6 is a flowchart indicative of an authentication processing procedure practiced as a still different embodiment of the invention.

Referring to FIG. 6, there is shown a flowchart indicative of another exemplary authentication procedure. This authentication procedure is based on a WEP key. In steps S21 through S23, probe request, probe response, and authentication request are executed as with the above-mentioned procedure.

In step S24, the home server 1 requests the client apparatus 2 for encryption based on WEP key. In step S25, in response to the encryption request, the client apparatus 2 makes a response of encryption based on WEP key to the home server 1.

When the authentication is successful, the home server 1 makes an authentication response indicative of the successful authentication to the client apparatus 2 in step S26. Then, communication starts between the home server 1 and the client apparatus 2. In step S27, the client apparatus 2 requests the home server 1 for association. In step S28, in response to the association request, the home server 1 makes an association response.

Thus, executing the authentication processing based on proximity wireless communication every time wireless connection is set can significantly enhance the security level. To be more specific, because the communicable range of the proximity wireless communication based on a RFID tag is less than one meter, approximately 10 cm for example, any third party outside this range cannot execute authentication processing. For example, in the above-mentioned example of a home LAN practiced as one embodiment of the invention, a range of one meter around the home server 1 is inside the house, so that any unauthorized third party cannot execute authentication processing, thereby surely preventing any such third parties from entering any networks based on wireless LAN.

Installing a host apparatus (an access point for example) at a place where any unauthorized third party can access in an office and executing authentication processing on the host apparatus can prevent any third party, such as persons who retired from companies, from entering the LAN system by use of the connection setting information obtained when they were employees thereof.

Further, the wireless connection system practiced as one embodiment of the invention uses no complicated encryption technology, thereby preventing the system from getting complicated with respect to the configuration thereof. Although it is required to bring the client apparatus close to the host apparatus at the time of authentication processing, this does not unduly increase user load because the established authentication remains valid until the communication is disconnected.

While preferred embodiments of the present invention have been described using specific terms, such description is for illustrative purpose only, and it is to be understood that changes and variations may be made without departing from the spirit or scope of the following claims. For example, connection setting information may include user ID and user password in addition to SSID and WEP key. In addition, WPA (Wireless Protected Access) capability and PKI (Public Key Infrastructure) board may be used.

In one embodiment described above, the wireless connection based on the wireless LAN compliant with the IEEE 802.11 standard is used; however the wireless connection system practiced as one embodiment of the invention is also applicable to another scheme of wireless communication. For example, the wireless connection system practiced as one embodiment of the invention is applicable to the wireless connection based on PAN (Personal Area Network) including Bluetooth and UWB (Ultra Wide Band). In the above description of the proximity wireless communication based on RFID tag, the radio wave scheme is used. It will also be apparent that another scheme, such as electromagnetic coupling or electromagnetic induction, is available.

What is claimed is:

1. A wireless connection system having at least one host apparatus and at least one client apparatus, wherein:
proximity wireless communication is executed via a first data transfer system when said client apparatus is brought physically close to said host apparatus, the first data transfer system transferring data directly between the host and client apparatus via first electromagnetic energy transmitters and receivers of the respective host and client apparatus, the first electromagnetic energy transmitters and receivers being only capable of short range data transfer;
authentication data is transferred between the host apparatus and client apparatus using the first data transfer system that is used in authentication processing for enabling a second data transfer system, the second data transfer system transferring data to and from the client apparatus via a second electromagnetic transmitter and receiver of the client apparatus that respectively transmit and receive a type of electromagnetic energy that is different from a type of electromagnetic energy utilized by the first data transfer system; and
if authentication is successful in said authentication processing, execution of wireless communication is enabled via the second data transfer system.

2. The wireless connection system according to claim 1, wherein said client apparatus has an information recording medium to which said connection setting information is recorded.

3. The wireless connection system according to claim 2, wherein said information recording medium is a radio frequency identification tag.

4. The wireless connection system according to claim 1, wherein a communicable range of said proximity wireless communication is less than one meter.

5. A wireless communication method for establishing wireless communication with at least one client apparatus, comprising:
executing proximity wireless communication between a host apparatus and a client apparatus via a first data transfer system when the client apparatus is brought physically close to said host apparatus, the first data transfer system transferring data directly between the host and client apparatus via first electromagnetic energy transmitters and receivers of the respective host and client apparatus, the electromagnetic energy transmitters and receivers being only capable of short range data transfer;
wherein authentication data is transferred between the host apparatus and client apparatus using the first data transfer system that is used in performing authentication processing for the second data transfer system, the second data transfer system transferring data to and from the client apparatus via a second electromagnetic transmitter and receiver of the client apparatus that respectively transmit and receive a type of electromagnetic energy that is different from a type of electromagnetic energy utilized by the first data transfer system; and
if authentication is successful in said authentication processing, enabling execution of said wireless communication.

* * * * *